United States Patent

Miller et al.

(10) Patent No.: US 10,141,556 B2
(45) Date of Patent: Nov. 27, 2018

(54) SEPARATORS FOR VRLA BATTERIES AND METHODS RELATING THERETO

(71) Applicant: Daramic, LLC, Charlotte, NC (US)

(72) Inventors: Eric H. Miller, Philpot, KY (US); Robert W. Saffel, Rockport, IN (US)

(73) Assignee: Daramic, LLC, Charlotte, NC (US)

( * ) Notice: Subject to any disclaimer, the term of this patent is extended or adjusted under 35 U.S.C. 154(b) by 184 days.

(21) Appl. No.: 15/147,391

(22) Filed: May 5, 2016

(65) Prior Publication Data

US 2016/0329540 A1    Nov. 10, 2016

Related U.S. Application Data

(60) Provisional application No. 62/157,039, filed on May 5, 2015.

(51) Int. Cl.
  *H01M 2/16* (2006.01)
  *H01M 10/12* (2006.01)
  *H01M 2/18* (2006.01)

(52) U.S. Cl.
  CPC ......... *H01M 2/1613* (2013.01); *H01M 2/166* (2013.01); *H01M 2/1666* (2013.01); *H01M 2/18* (2013.01); *H01M 10/121* (2013.01); *H01M 2/1686* (2013.01)

(58) Field of Classification Search
  None
  See application file for complete search history.

(56) References Cited

U.S. PATENT DOCUMENTS

| | | | |
|---|---|---|---|
| 5,665,488 A | 9/1997 | Young et al. | |
| 6,703,161 B2 * | 3/2004 | Zucker | H01M 2/1606 429/145 |
| 7,094,498 B2 | 8/2006 | Miller et al. | |
| 2003/0054237 A1 | 3/2003 | Zucker | |
| 2008/0299462 A1 | 12/2008 | Whear et al. | |
| 2010/0129720 A1 | 5/2010 | Sako et al. | |
| 2011/0229750 A1 * | 9/2011 | McLellan | H01M 2/162 429/144 |
| 2012/0070714 A1 * | 3/2012 | Chambers | C08L 89/00 429/145 |
| 2012/0094183 A1 | 4/2012 | Deiters et al. | |

OTHER PUBLICATIONS

International Search Report and Written Opinion of the International Searching Authority, PCT Application No. PCT/US2016/030921, dated Aug. 19, 2016, 15 pages.

\* cited by examiner

*Primary Examiner* — Scott J. Chmielecki
(74) *Attorney, Agent, or Firm* — Hammer & Associates, P.C.

(57) ABSTRACT

Improved battery separators, batteries, and systems, as well as methods relating thereto are disclosed herein for use in various lead acid batteries such as valve-regulated lead acid (VRLA) batteries that include one or more AGM layers. The improved battery separators described herein may provide a battery system with an advantage of a significantly decreased acid filling time and a significantly increased acid filling speed. Various improved batteries, methods and systems are described herein using such improved battery separators that increase acid filling speed and decrease acid filling time for a VRLA battery.

20 Claims, 3 Drawing Sheets

SEPARATORS FOR VRLA BATTERIES AND METHODS RELATING THERETO

REFERENCE TO RELATED APPLICATIONS

This application claims the benefit of and priority to U.S. provisional patent application Ser. No. 62/157,039, filed May 5, 2015, which is fully incorporated by reference herein.

FIELD

In accordance with at least selected embodiments, the present disclosure or invention is directed to improved battery separators, batteries, and/or methods of manufacture and/or use. In accordance with at least certain embodiments, the present disclosure or invention is directed to improved separators for VRLA batteries (including AGM, gel, sealed, and/or maintenance-free batteries) and/or improved methods of filling a VRLA battery with acid using a particular improved battery separator. In addition, disclosed herein is a method, system and battery separator for enhancing acid filling, improving acid diffusion, increasing acid filling speed, decreasing the time it takes to fill a battery with acid, improving acid transport (e.g., making the acid transport more uniform over the entire electrode surface) to avoid hydration shorts, lowering battery manufacturing cost (because of increased acid filling speed), protecting electrodes, and/or improving overall battery life of a lead acid battery, especially a VRLA AGM lead acid battery.

BACKGROUND

Valve-regulated lead acid (VRLA) batteries, which are typically vented batteries with electrolyte suspended between the electrodes, are known in the art. They may provide certain advantages over flooded lead acid batteries (by way of example only, free-flowing electrolyte) while they may possess certain disadvantages compared with flooded batteries (by way of example only, they may take 3-10 times longer, or more, to fill with acid than counterpart flooded batteries and they may be more expensive than flooded batteries, since they may contain, for example, more lead). When VRLA batteries are filled with acid, the acid is injected to cover the electrodes and this may be done, in some instances, under vacuum or reduced pressure (possibly to ensure uniform acid filling).

Some VRLA batteries are known as VRLA-AGM batteries, meaning that the separator used in such batteries may include one or more layers of an AGM (absorptive glassmat or absorbed glass mat). Depending on VRLA-AGM battery design, up to 2-4 attempts, or more, may be needed to fill a VRLA-AGM battery with acid, compared with filling a counterpart flooded battery, which might require only one acid filling event or step or attempt. It is important to fill batteries with acid as quickly as possible in order to decrease production time (and therefore production cost) but also to preserve the quality of the battery. This is because, as batteries are being filled with acid, the acid can react with unformed plates and turn to water, thereby solubilizing lead and potentially leading to shorts, such as hydration shorts. Thus, acid filling needs to be uniform and quick, such that a battery manufacturer can complete the steps of battery formation and charging as quickly as possible and maintain high quality for the battery.

Various battery separators for VRLA batteries are also known in the art. As mentioned above, users might employ one or more layers of an AGM (absorptive glassmat or glass mat) as the separator with VRLA batteries. Such AGM layers may be made of glass fibers, polymeric fibers, or a combination thereof. An AGM layer may absorb battery acid like a sponge or act as an acid reservoir, immobilizing the acid, and such AGM layers may perform well in the acid-limited or acid-starved system, which is also under compression. However, the glass fibers in AGM separators may break over time during cycling and under high compression. The degradation of the glass fibers may change the level of compression in the battery system over time and may influence acid migration within the AGM separator, possibly resulting in poor acid availability to the electrodes and/or potentially leading to acid stratification. Acid stratification in a VRLA battery may lead to underutilization of a portion of the electrodes potentially resulting in sulfation, poor battery performance, and/or short or shorter cycle life. Additionally, while acid-filling a VRLA battery using a traditional AGM separator, an electrode may become more reactive, consuming acid and/or converting it to water or steam, which can create lead sulfate and can lead to hydration shorts, dendrite growth, battery life reduction, dry spots, and/or thermal runaway. The last regions of the AGM separator to be wetted by the electrolyte are the most prone to risk of hydration shorts.

In some instances, such as in U.S. Pat. No. 6,703,161 owned by Daramic, LLC of Charlotte, N.C., and incorporated by reference herein, there have been disclosed battery separators for lead acid storage batteries that are, for instance, multi-layer battery separators, and such separators may be used with VRLA batteries.

VRLA batteries may also, in certain instances, be described as "gel" batteries, and they include a battery separator as well as fumed silica in the electrolyte that immobilizes the electrolyte or acid and turns the electrolyte or acid into a gel. In some instances, VRLA gel batteries may provide certain advantages, such as, for example, higher capacity, deeper cycling, and/or more robust performance. Still other batteries are hybrid VRLA AGM and gel (sometimes called faux-gel) batteries that may include an AGM separator with gelled acid on the top of the cell or some fumed silica inside the AGM separator or in the acid or in the system, so that the system does not dry out.

There is a need to further develop even more improved battery separators for all types of VRLA batteries (including AGM, gel, and those batteries, sometimes called hybrid VRLA AGM batteries, that combine aspects of AGM and gel).

SUMMARY

In accordance with at least selected embodiments, the present disclosure or invention may address the above mentioned and other needs. For example, in accordance with at least certain embodiments, the present disclosure or invention is directed to improved separators for VRLA batteries and/or improved methods of filling a VRLA battery with acid using a particular improved battery separator.

Disclosed herein are improved battery separators and improved methods of filling a battery using a particular improved battery separator. In addition, disclosed herein is a method, system and battery separator for enhancing acid filling, improving acid diffusion, increasing acid filling speed, decreasing the time it takes to fill a battery with acid, improving acid transport (e.g., making the acid transport more uniform over the entire electrode surface) to avoid hydration shorts, lowering battery manufacturing cost (because of increased acid filling speed) and improving overall battery life of a VRLA battery.

The improvements associated with the separators and methods described herein may be unexpected, as traditionally, it was thought that the best way to obtain the desired level of intimate contact between the positive plate and the negative plate of a VRLA AGM battery was by using an AGM layer, or by combining such an AGM layer or layers with a flat polyethylene separator as a microporous polyolefin layer.

BRIEF DESCRIPTION OF THE DRAWINGS

FIG. 1 includes photographs of various improved VRLA battery separators made according to embodiments described herein, wherein: FIG. 1(c) depicts a separator that includes embossments. Embossments may include various patterns (e.g., straight patterns, wavy patterns, patterns bearing various picture patterns, such as floral or logo patterns, and so forth) so long as an element of texturing is imparted to the improved VRLA battery separator. For the separator of FIG. 1(c), the embossments include a wavy pattern imparted to a flat microporous polyolefin separator. For each of the separators depicted in FIGS. 1(a), 1(b), and 1(c), the ribbed and/or embossed side of the separator shown in the photograph may be placed against the negative electrode in the improved VRLA battery. The other side (not shown) of each separator may be placed against the positive electrode and/or against one or more AGM layer.

FIG. 3 illustrates various leaning, deformed, and/or compressed ribs, which create acid filling channels (or air flow channels) on the improved separator. The ribs may be described as "leaning, deformed, and/or compressed" from the embossing method applied to a separator already bearing ribs; from compression in a battery system over time; or from both the formation or embossing method and compression in a battery system over time.

DETAILED DESCRIPTION

In various embodiments described herein, a novel or improved separator is employed that preferably comprises a microporous polyolefin separator layer and an AGM layer. The microporous polyolefin separator layer comprises a plurality of acid filling channels or a network of acid filling channels. These acid filling channels are imparted to this microporous polyolefin separator layer by adding ribs to the layer and/or embossing the layer. When ribs are added to the layer, such ribs may be added to one side or both sides of the microporous polyolefin separator layer. Such ribs may vary in height and spacing, and such ribs may be embossed or textured. In some embodiments where ribs are added to both sides of the microporous polyolefin separator layer, one side may include mini ribs or negative cross-ribs. In some embodiments, the mini ribs or negative cross-ribs may be at an angle, from 0 degrees to 180 degrees, relative to the machine direction or the transverse direction of the separator layer. In various embodiments, a specific pattern of ribs may be added to the microporous polyolefin separator layer, and such a pattern may include battlements (such as those battlement ribs described in U.S. Pat. No. 7,094,498 to Daramic, LLC, which is hereby incorporated by reference herein in its entirety), serrations, interrupted ribs, continuous ribs, discontinuous ribs, and/or the like. The various patterns of ribs and/or embossed regions (sometimes potentially called calendered regions) include patterns that allow battery acid into the separator quickly, while simultaneously allowing air to escape out of the separator. In some preferred embodiments, the acid filling channels (or air flow channels) allow air flow while at the same time the ribs or embossments forming the acid filling channels are not so large as to interfere with the separator's overall contact with the electrodes.

After acid filling channels are created on this microporous polyolefin separator layer, it is joined with one or more AGM layers to form the preferred composite or multi-layer separator disclosed herein. Various methods contemplated herein involve providing a VRLA battery system including an anode and a cathode and placing a composite separator as described herein between the anode and the cathode under compression, and filling the battery system with acid, where the acid filling time is reduced, and preferably, significantly reduced compared with the acid filling time for VRLA batteries employing traditional battery separators (such as one or more AGM separators or layers or a composite AGM separator including a flat, unribbed or un-embossed polyethylene separator layer, in conjunction with one or more AGM layers). For example, the acid filling time may be reduced by 3 times, by 4 times, by 5 times, or in some embodiments, by 6 times, by 7 times, by 8 times, by 9 times, or in some embodiments, by 10 times, or more when compared to the acid filling time for a previously known VRLA battery or VRLA AGM battery. Such significantly reduced acid filling time results in a significantly reduced time needed for battery formation as well as enhanced quality of the battery, as formed, because of the lowered risk of hydration shorts, sulfation, and/or other events that could reduce the overall cycle life of the battery and/or the overall performance of the lead acid battery. The improved separators, batteries, methods, and systems described herein may also influence gas recombination in the battery system.

In certain embodiments herein, an improved multi-layer battery separator for a VRLA battery is formed comprising one or more AGM layers and a porous polyethylene layer that comprises vertical acid filling channels, which channels provide the separator with areas of lower compression and areas of higher compression, relative to the electrodes in the battery, and which acid filling channels facilitate, particularly in the areas of lower compression, more rapid acid transport compared to acid transport obtained using conventional separators. During filling of the battery with acid, the separators described herein enhance the diffusion of the acid toward the interior region of the electrodes. The non-uniform compression that is imparted to one or both sides of the battery separator described herein leads to increased acid filling speeds while retaining one or more AGM layers as an acid reservoir against the positive plate, the negative plate, or both. The separators and methods described herein create a non-uniform compression pathway using the ribs and/or embossments on the improved separator, thereby allowing air to escape and allowing acid to enter between the electrodes, whether the electrodes are wet or dry.

In various embodiments described herein, a novel or improved VRLA separator is employed that comprises at least one microporous polyolefin separator layer and at least one AGM layer or other nonwoven layer.

The separators, methods and battery systems described herein may provide improved resiliency for the separator and system with less likelihood of breaking down over time, which resiliency may be important for maintaining intimate contact within the system that includes the battery electrodes and the new, improved composite separator and which resistance to degradation or breaking down of the micro glass fibers may be important for battery performance and life.

In various embodiments, the microporous polyolefin separator layer comprises polyethylene. In some embodiments, the polyethylene is high molecular weight polyethylene. In various embodiments, the high molecular weight polyethylene is ultra-high molecular weight polyethylene (and may contain various fillers, plasticizers, agents, additives, and/or the like). Fillers may include materials such as silica and the like.

In various embodiments, the microporous polyolefin separator layer is ribbed and/or embossed. The preferred ribs may be 0.008 mm to 1 mm tall and may be spaced 0.001 mm to 10 mm apart, while the preferred backweb thickness of the microporous polyolefin separator layer without ribs or embossments may be about 0.05 mm to about 0.25 mm, for example, in some cases, 0.05 mm thick, or 0.075 mm thick, or 0.080 mm thick, or 0.1 mm thick, or 0.15 mm thick, or 0.175 mm thick, or 0.2 mm thick, or 0.225 mm thick, or 0.25 mm thick. In some embodiments, the ribs may be in a pattern, such as they may be on one side of the separator layer or on both sides of the polyolefin separator, from 0 to 90 degrees in relation to each other. Various patterns including ribs on both sides of the separator layer may include negative cross-ribs on the second side or back of the separator or mini ribs on the second side or back of the separator. In other embodiments, the ribs may be in a pattern such that vertically positioned ribs are spaced 0.5-1.0 mm apart with an opposing smooth or flat back side. Another pattern of ribs may include wider spacing, e.g., 3-6 mm apart, where such ribs are taller and the separator layer has an opposing smooth or flat back side. Such a pattern includes ribs that are more widely spaced apart than various patterns already mentioned and thus there are fewer acid filling channels imparted to the improved separator.

Similarly, the embossments may have various configurations, such as, by of example, a textured embossing pattern where, when viewed under a microscope, such as a 3-D microscope, dark spots signify areas with smaller pores or a compressed pore structure and where cross-section views, images or micrographs show the acid filling channels created by the textured embossing. Such a separator is shown in the images included in FIG. 5.

What the texturing (through the addition of ribs and/or embossed regions) of the separator may lead to is a bi-modal pore size of the separator system (AGM+textured microporous polyolefin separator layer, such as a PE layer) while under compression >10 kpa (a pressure typically found in a VRLA battery). The smaller pores may provide the improved separator or system with dendrite and/or short protection (e.g., possibly because of high tortuosity, etc.), may facilitate acid absorption, and/or may allow for high capillary action to hold or retain acid, retarding acid stratification, while the larger pores may provide the improved separator or system with gas transfer (e.g., efficient oxygen transfer) through the membrane or separator and/or may create larger pathways for acid displacement, as these pores are under less pressure than the smaller pores. In various embodiments, the acid retention obtained by the capillary action from larger pores to smaller pores may retard dry spots in the separator and/or may hinder thermal runaway of a battery system using such a separator. Improving the cycling of VRLA batteries using the improved separators, methods and systems described herein may result from the improved transference of oxygen within the improved separator between the electrodes to avoid dry out, etc.

In various embodiments, the bi-modal pore size distribution of the textured microporous polyolefin separator may include regions of larger pores and regions of smaller pores. Various combinations of pore sizes can be created with possibly preferred pore sizes between about 0.01 micron and 6 microns, such that various bi-modal pore size distributions may be created. By way of example only, a region of larger pores might include pores that are 1-6 microns in size, while pores in the region(s) of smaller pores might be sub-micron in size. The pore size will depend on the initial pore size distribution in the separator before various ribs and/or embossments are added thereto.

The separator formed in various embodiments herein is compressible and is resilient especially when combined with one or more AGM layers and placed under compression between the electrodes of a VRLA-AGM battery. This compressibility and resiliency of the improved separator described herein may be important, for example, in deep cycling of the battery system. In various embodiments, the separator is 25% compressible. In other embodiments, the separator is about 10% to about 40% compressible at a pressure greater than 10 kpa.

Some VRLA batteries may be constructed for higher compression applications, 30-100 kpa, or higher, for example, and these may be used in deep cycling applications to maximize battery life by reducing shedding of the positive active material (PAM). Some VRLA batteries may be difficult to fill (e.g., a large cell or a tall cell) where there is a need to increase battery capacity and power. Other VRLA batteries may be constructed for somewhat lower compression applications (10-29 kpa, or less, for example) and these may fill more easily but may experience increased concern for PAM shedding and reduced cycle life. The separators described herein are able to provide a balance to either type of system, such that acid filling time is decreased for batteries under both types of compression and such that batteries under both types of compression are improved, as well as batteries that may be traditionally harder to fill or larger or taller.

The separator described herein may be resilient as well as compressible. The increased levels of compressibility and resiliency of the improved separator may mean that the thickness variation from the embossing and/or the addition of ribs to the improved separators leads to desirable spring back (e.g., spring back of the improved ribbed, or textured, or embossed microporous polyolefin separator layer over the life of the battery, as AGM fibers in the one or more AGM layers break down over time) and continued high compression of the positive active material (PAM) on the positive electrode over time. The positive electrode in a lead acid battery is not static but grows and shrinks in size during deep cycling. The grid movement loosens the PAM over time as well as breaking the AGM fibers in the one or more AGM layers. Enhanced resiliency or spring back of the improved or inventive separator described herein (for example, a ribbed and/or textured and/or embossed microporous polyolefin separator layer as part of a novel or improved composite) may mean that compression and intimate plate contact is maintained over time, thereby resulting in improved battery performance, less PAM shedding, and less PAM migration though the separator creating shorts (for example, in deep cycle applications of a battery), and thus improvement in a battery's overall cycle life. Thus, the battery systems described herein using the improved battery separators described herein exhibit improved compression and resiliency. In certain embodiments, a separator, such as the textured embossed separator depicted in FIG. 5, may exhibit a compressibility of 25% and desirable spring back for keeping PAM compressed under desirable high compression over the life of the battery.

In various VRLA battery systems described herein, the acid filling time is significantly decreased compared with battery systems using other known or conventional separators. This may be important, for example, because at times, a higher acid filling time can lead to poorer overall quality for the battery system because while filling, acid may turn to water and solubilize some of the lead in the system, creating lead sulfate and leading to hydration shorts. Thus, for the present separators, methods and systems, the lower acid filling times lead to higher overall quality of the electrodes, battery system and lower cost of production with fewer rejects.

In many of the improved separator, battery, method, and system embodiments described above, the acid filling channels, produced by ribs and/or embossed regions in the polyethylene separator layer, are made of stable materials such that they remain part of the separator throughout the life of the battery. In some embodiments, rather than spring back, the embossments and/or ribs may collapse over time, which may be desirable as intimate contact between the electrodes may be maintained. In such situations, the embossments and/or ribs create acid filling channels or air flow channels that greatly increase the speed of acid-filling a battery (for example, a starting battery) comprising the improved separator; and such a purpose (e.g., increased acid-filling speed) has already been fulfilled before the ribs and/or embossments collapse. Additionally, in various embodiments, the ribs and/or embossments embed into the negative active material (NAM) after formation and during battery cycling, as the purpose of the ribs and/or embossments (e.g., increased acid-filling speed) has already been fulfilled before the ribs and/or embossments embed into the NAM.

In other embodiments herein, the acid filling channels on the microporous polyolefin separator layer actually dissolve after acid filling is complete in the battery system, leading to improved contact between the electrodes and the separator and improved compression while at the same time facilitating the significantly improved acid filling process (e.g., lowering the time for acid filling) for the battery system compared with systems using conventional separators. In such embodiments, the filling channel may be made of some polymer, starch or starch derivative, and may dissolve into $CO_2$ or some other inert gas after contact with acid during acid filling. In such embodiments, the battery system is provided with maximum acid availability after the acid filling process is complete. In some similar embodiments, the rib, embossed region, and/or filling channel may comprise fumed silica and/or a binder which may dissolve into the AGM separator after the battery is filled with acid. In still other similar embodiments, fumed silica is added to the electrolyte system, which fumed silica swells, thereby closing or reducing the size of the filling channels after acid filling.

In some embodiments, the microporous polyolefin separator layer may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss. Also, if the ribs are placed against a plate or electrode, the ribs may be coated (for example, the tips of the ribs may be coated) with a conductive material to further enhance battery performance, plate life, and/or the like.

The coating, such as an additive, such as a non-ionic surfactant, or an anionic surfactant, can be present in an amount of at least 0.5 $g/m^2$, 1.0 $g/m^2$, 1.5 $g/m^2$, 2.0 $g/m^2$, 2.5 $g/m^2$, 3.0 $g/m^2$, 3.5 $g/m^2$, 4.0 $g/m^2$, 4.5 $g/m^2$, 5.0 $g/m^2$, 5.5 $g/m^2$, 6.0 $g/m^2$, 6.5 $g/m^2$, 7.0 $g/m^2$, 7.5 $g/m^2$, 8.0 $g/m^2$, 8.5 $g/m^2$, 9.0 $g/m^2$, 9.5 $g/m^2$ or 10.0 $g/m^2$ or more. The additive can be present on the separator in an amount between 0.5-12 $g/m^2$, 1.0-12.0 $g/m^2$, 1.5-12.0 $g/m^2$, 2.0-12.0 $g/m^2$, 2.5-12.0 $g/m^2$, 3.0-12.0 $g/m^2$, 3.5-12.0 $g/m^2$, 4.0-12.0 $g/m^2$, 4.5-12.0 $g/m^2$, 5.0-12.0 $g/m^2$, 5.5-12.0 $g/m^2$, 6.0-12.0 $g/m^2$, 6.5-12.0 $g/m^2$, 7.0-12.0 $g/m^2$, 7.5-12.0 $g/m^2$, 5.0-10.5 $g/m^2$, 5.0-11.0 $g/m^2$, or 5.0-15.0 $g/m^2$.

The AGM layer or layers described herein typically are made of at least a majority glass fibers. In some instances, glass fibers are combined with polymer fibers to make the AGM layer.

Various results obtained herein are unexpected in that with a VRLA-AGM-type battery system that is under compression, it would never have been expected that separators according to the various embodiments described herein would decrease acid filling times for battery systems and, at the same time, lead to an overall improved battery system or performance. In the past, VRLA-AGM-type battery systems have used one or more layers of AGM, or if layered with a polyethylene separator, such separator has been flat, because, by way of example only, and not meant to be limiting, previous thinking about the system, which is under compression, is that only a flat separator (e.g., one or more flat layers of AGM, which layers serve as an acid reservoir, possibly with a flat polyethylene separator layer as part of an AGM-PE composite) would provide uniform compression to the system, and previous thinking was that a three-dimensionally shaped separator, such as the improved composite separators described herein, would not provide the desired uniform compression to the system. In addition, the system experiences the benefits of using a polyethylene separator <1 micron pore size (e.g., hindering shorts, increasing battery life) while also being able to be filled faster than a typical lead acid battery, preferably 3, 4, 5, 6, 7, 8, 9, 10, or more times faster than a typical VRLA-AGM battery, equaling or even bettering the acid filling time of a conventional flooded lead acid battery.

A battery producer's productivity is greatly increased by the improved separators, batteries, methods, and systems described herein, as acid filling time has been significantly decreased, leading to reduced manufacturing time and cost associated therewith.

Various batteries and applications may benefit from the improved separators, methods, batteries, and systems described herein. By way of example only, such may be used in VRLA-AGM batteries in e-bikes, SLI (starting lighting ignition) VRLA automotive batteries, motive power batteries, e-car batteries, golf car batteries, and so forth.

EXAMPLES

In these Examples, separators were formed according to various embodiments described herein and tested to determine various properties and improvements.

One control separator ("Control 1") used in the Examples below was a one-layer AGM separator (specifically, a commercially available AGM separator known as H&V BGO 15565, which has a basis weight of 155 $g/m^2$).

Various improved polyethylene separator layers (to become part of a composite separator) were made by a method for producing a microporous material comprising the steps of: providing an Ultrahigh Molecular Weight Polyethylene (UHMWPE); providing a processing plasticizer; adding a filler (such as silica) and the UHMWPE in a mixture being in the range of from about 1:9 to about 15:1 filler to UHMWPE by weight; adding the processing plasticizer to the mixture; extruding the mixture to form a sheet from the mixture; calendering and molding the sheet to form either a flat sheet (Samples 4 and 5 below) or a ribbed profile (Samples 1-3 below); extracting the processing plasticizer from the sheet to produce a microporous membrane; and post-embossing the microporous membrane with various rib and/or embossment patterns thereon (Samples 6-8 below), according to Table 1 below:

TABLE 1

| Separator and Profile Description | Backweb Thickness (mm) | Overall Thickness (mm) | Rib Spacing (mm) | Rib Height from Profile Drawing (mm) |
|---|---|---|---|---|
| AGM Layer, H&V BGO 15565 (Control 1) | NA | 1.16 | NA | NA |
| PE Layer with a Profile That is Flat on One Side; Ribs on One Side (Sample 1) | 0.25 | 0.4 | 0.5 | 0.12 |
| PE Layer with a Profile That is Flat on One Side; Ribs on One Side) (Sample 2) | 0.22 | 0.34 | 4.16 | 0.152 |
| PE Layer with a Profile That Has Ribs on One Side; Negative Cross Ribs on One Side (Sample 3) | 0.175 | 0.395 | 0.5 | 0.12 |
| PE Layer with a Profile That is Flat on Both Sides (Sample 4) | 0.2 | 0.2 | NA | NA |
| Thin PE Layer with a Profile That is Flat on Both Sides (Sample 5) | 0.081 | 0.081 | NA | NA |
| Thin PE Layer (same starting material as Sample 5 above) with Random Micro-Embossing Textured Profile (Sample 6) | 0.095 | 0.095 | NA | NA |
| PE Layer with Z-Rib (Zig-Zag) Embossing Profile (Sample 7) | 0.256 | 1.035 | NA | NA |
| PE Layer with Z-Rib (Zig-Zag) Embossing Profile (Sample 8) | 0.135 | 0.976 | NA | NA |

Figure 1A:
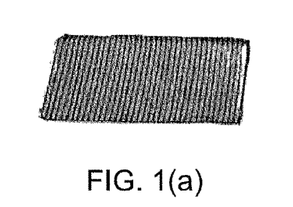
FIG. 1(a) depicts a separator that includes ribs.
Figure 1B:
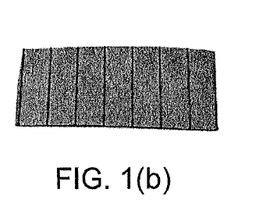
FIG. 1(b) depicts a separator that includes ribs that differ in size and spacing from the ribs included on the separator of FIG. 1(a)
Figure 5:
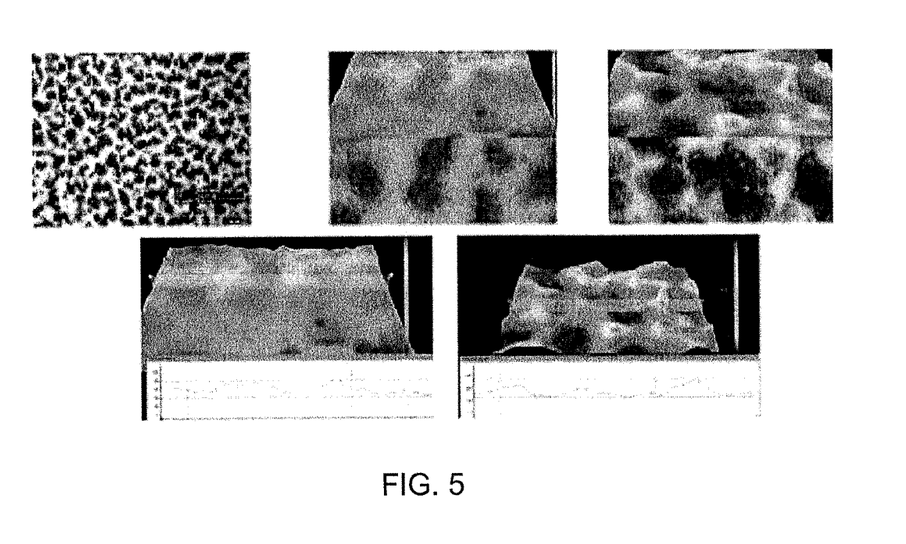
FIG. 5 includes images of one or more separators having a textured embossing pattern thereon, wherein, when viewed under a microscope, such as a 3-D microscope, dark spots signify areas with smaller pores or a compressed pore structure, and wherein cross-section views, images or micrographs show the acid filling channels created by the textured embossing.

For Sample 1, the rib pattern is shown in FIG. 1(a). For Sample 2, the rib pattern is shown in FIG. 1(b). For Sample 3, the major rib pattern is shown in FIG. 1(a). For Sample 6, the textured embossed pattern was added to both sides of the polyethylene layer, as shown in FIG. 5.

Figure 1C:
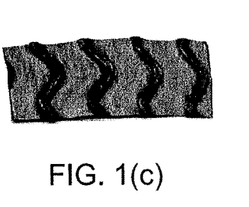
Figure 2:
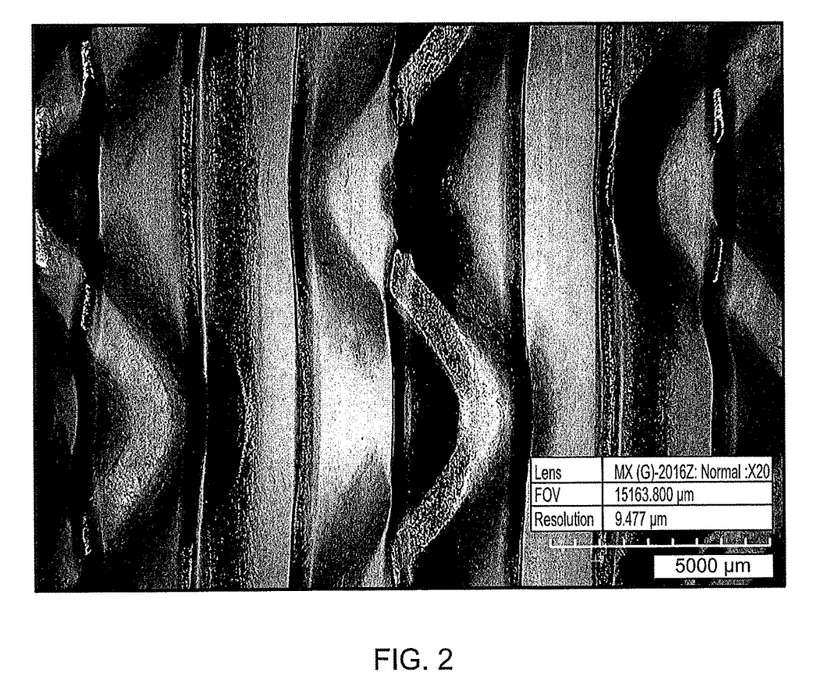
FIG. 2 includes a photograph of an improved VRLA battery separator made according to various embodiments described herein, wherein the separator includes ribs and embossments.
Figure 3:
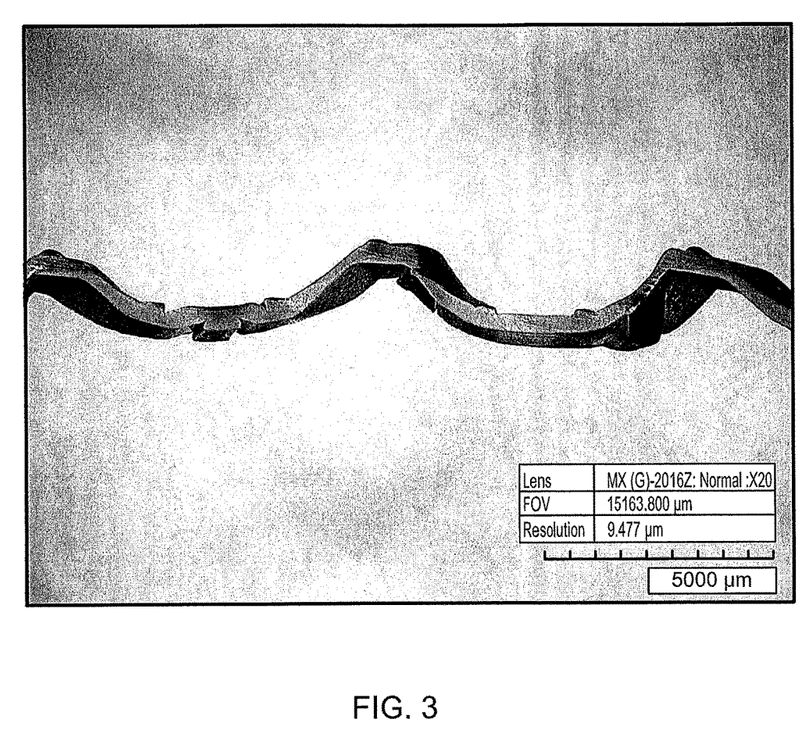
FIG. 3 includes a cross-sectional view of the improved VRLA battery separator depicted in FIG. 2.
Figure 4:
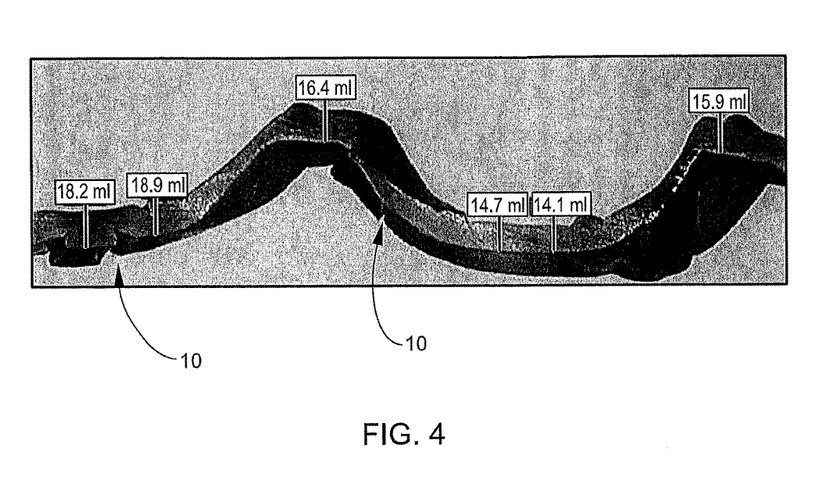
FIG. 4 is a close-up view of a portion of the improved VRLA battery separator depicted in FIG. 3, wherein acid filling channels (or air flow channels) 10 are included on the separator and wherein the side of the separator at the bottom of FIG. 4 is the side facing the negative electrode, while the side of the separator at the top of FIG. 4 is the side facing the positive electrode.

For Samples 7 and 8, the embossing profile was the embossing profile used for the separator depicted in FIG. 1(c).

Various improved composite separators according to the invention herein were formed using one or more layers of AGM, and the separators were positioned in batteries and tried and tested (including with the ribs facing toward the negative plate, or toward the jig surface simulating the negative plate, as well as with the ribs facing toward the AGM layer). In various embodiments, it may be preferred that the ribs and/or embossments face toward the negative plate rather than toward the AGM layer. In other embodiments, it may be preferred that the ribs and/or embossments face toward the AGM layer rather than toward the negative plate. In various embodiments, the AGM layer is placed against the positive plate, as it acts as an acid reservoir for the positive active material in the positive plate. In some embodiments of the present invention, two AGM layers are used such that they sandwich a ribbed and/or embossed and/or textured polyethylene layer between them.

To simulate battery acid filling conditions, a modified Gurley tester with a jig and various control and experimental samples were used. The samples were turned on their edges, and the process simulated two electrodes holding a battery separator (in various cases, a two-layer battery separator comprising an AGM layer and a layer of textured, and/or ribbed, and/or embossed polyethylene separator) in a compressed state, while the testing performed determined how much air went through the separator in a dry state and in a wet state.

The samples noted below were tested in water against 1.28 specific gravity battery acid. The process of acid filling a battery was duplicated for the test samples described below using air flow through a 100% wetted AGM separator composite.

TABLE 2

| Description of VRLA-AGM Separator | Dry Seconds | $H_2O$ Wet Seconds | 1.28 specific gravity Acid wet Seconds | times faster vs. AGM control (using acid wet seconds) | Wet acid weight (g) |
|---|---|---|---|---|---|
| AGM + Sample 8 (With Ribs or Embossments Toward AGM) | 6.6 | 8 | 5.3 | ~91 | 0.465 |
| AGM + Sample 7 | 15.7 | 21.7 | 7.6 | ~63 | 0.455 |

TABLE 2-continued

| Description of VRLA-AGM Separator | Dry Seconds | H$_2$O Wet Seconds | 1.28 specific gravity Acid wet Seconds | times faster vs. AGM control (using acid wet seconds) | Wet acid weight (g) |
|---|---|---|---|---|---|
| (With Ribs or Embossments Toward AGM) AGM + Sample 1 (With Ribs Toward Negative Electrode) | 10.6 | 11.7 | 22.3 | ~22 | 0.465 |
| AGM + Sample 6 | 15 | 27.3 | 27.6 | ~17 | 0.485 |
| AGM + Sample 2 (With Ribs Toward Negative Electrode) | 29 | 32 | 43 | ~11 | 0.497 |
| AGM + Sample 1 (With Ribs Toward AGM) | 83.6 | 110 | 82.3 | ~6 | 0.493 |
| Single Layer AGM (Control 1) | 93 | 126 | 482 | 1 | 0.485 |

The results in the table above were obtained using a modified Gurley test method for determining the time it takes for 100 cc of air to travel through the given separator, vertically. The Gurley value is the time needed to press an air volume with a constant pressure through a given sample. The method used a Gurley precision instrument, Model 4110N with 20 oz. cylinders as well as various jigs for measuring the air vertically through the separator. These jigs were equipment used to hold the separator samples vertically in the Gurley tester. Two jigs were used, one having a 1.0 mm opening for the separator and one having a 1.5 mm opening for the separator.

During the test method, the metal circular disk was removed from the bottom of the Gurley tester. The separator sample was cut to be the same size as the opening in the jig. Grooves in the jig allowed for proper sample sizing. The sample to be tested was inserted into the jig snugly without gaps or overlaps.

Samples were run both wet and dry. For the wet samples, the jig was placed in a container with a small amount of either deionized water or battery-grade sulfuric acid depending on the test (as noted above). The user ensured that the liquid level does not go above 1 mm on the jig. The liquid needs to wick up through the AGM and polyolefin separator layer to have a wet sample. Excess liquid was wiped away from the outside of the jig. The cylinder was raised until the spring catch engaged under the flange and supported it. The jig was inserted in the Gurley tester with the sample opening directly in the middle of the tester. There is a circle drawn on the jig for proper placement in the Gurley tester. The sample was clamped by a tightening handle. The spring support was then disengaged and the cylinder was lowered gently until it floats in the oil (oil with a viscosity of 60-70 s Saybold units at 38° C. and a flash point of more than 135° C.). Then the cylinder was released. Using a stopwatch, the time (in seconds) was measured required for the specific volume of air (100 cc) to pass through the sample by starting the time when the 100 cc mark is reached and stopping the time when the 200 cc mark is passed. The value was reported to the nearest 0.1 second.

In various Examples described above, good performance was obtained where the separator was thin and had a high level of surface area. In both a dry state and a wet state, the separators formed according to the embodiments described herein provided significant increases in speed of acid filling, and the acid was a liquid electrolyte system. And in various embodiments throughout these Examples and throughout this application, surprisingly it was found that using various ribs and/or embossments to make improved separators for VRLA-AGM batteries provide a system that provides a good balance between acid availability and faster acid filling using such a liquid electrolyte system. Such results are unexpected, as it has traditionally been thought that either (a) one or more flat AGM layers, or (b) a composite separator using one or more flat AGM layers and a flat polyethylene layer is necessary for an effective VRLA-AGM battery and that ribs, for example, would displace acid, such as liquid electrolyte or liquid acid, needed for proper performance of the battery. However, the improved separators, batteries, methods, systems, and filling methods show unexpected results compared with previous thinking.

In various other Examples, an improved polyethylene separator layer according to various embodiments above is sandwiched between two layers of AGM, and the multi-layer battery separator is used in a VRLA battery. For instance, the results shown in Table 3 below indicate information about various composite separators formed in accordance with the present invention, that include various polyethylene (PE) separator layers formed in accordance with embodiments described herein, each of which PE separator layer is sandwiched between two layers of the AGM mentioned above as Control 1, to form the composite separator. The table provides various test results.

TABLE 3

| Description of VRLA-AGM Separator where AGM = Control 1 | Total thickness (mm) | % compression | Dry sample seconds | Wet sample seconds acid (where 999 = >5 minutes) | % change from control (wet) | Dry weight (g) | Wet weight (g) | Water pickup (g) |
|---|---|---|---|---|---|---|---|---|
| AGM + Sample 8 + AGM | 3.11 | 52 | 15 | 68.6 | −1356 | 0.143 | 0.871 | 0.728 |
| AGM + Sample 7 + AGM | 3.28 | 54 | 20 | 72 | −1288 | 0.168 | 0.889 | 0.721 |
| AGM + Sample 6 + AGM | 2.89 | 48 | 46 | 999 | 0 | 0.133 | 0.907 | 0.774 |
| Two | 2.25 | 33 | 57 | 999 | Control | 0.116 | 0.857 | 0.741 |

TABLE 3-continued

| Description of VRLA-AGM Separator where AGM = Control 1 | Total thickness (mm) | % compression | Dry sample seconds | Wet sample seconds acid (where 999 = >5 minutes) | % change from control (wet) | Dry weight (g) | Wet weight (g) | Water pickup (g) |
|---|---|---|---|---|---|---|---|---|
| layers of AGM (2 layers of Control 1) | | | | | | | | |
| AGM + Sample 1 + AGM | 2.69 | 44 | 74 | 999 | 0 | 0.179 | 0.878 | 0.699 |
| AGM + Sample 2 + AGM | 2.62 | 43 | 93 | 999 | 0 | 0.171 | 0.858 | 0.687 |

The results above are surprising and show very good results, good air flow (the fastest air flow speeds), and higher acid filling speed (and therefore decreased acid filling time) in particular for some of the embossed PE separators, such as Samples 7 and 8, with high compression (such as the 52% compression shown above) when sandwiched between two AGM layers.

Additionally, in various other Examples, a multi-layer battery separator for a VRLA battery is formed that includes a layer of AGM sandwiched between two layers of improved polyethylene separator according to various embodiments described above, where the two layers of improved PE separator can be the same or different, and can have ribs or embossments or texturing, or the like according to the inventions described herein. Furthermore, in various other Examples, the improved polyethylene separator material formed as described above is made into a leaf, a sheet, a sleeve, a pocket, an envelope, and the like.

In accordance with at least selected embodiments, aspects, or objects, there are provided improved battery separators, batteries, systems, and/or methods of manufacture, filling, and/or use. In accordance with at least certain embodiments, aspects, or objects, the present disclosure or invention is directed to improved separators for VRLA batteries (including AGM, gel, and those batteries that combine aspects of AGM and gel) and/or improved methods of filling a VRLA battery with acid using a particular improved battery separator. In addition, disclosed herein is a method, system and battery separator for enhancing acid filling, improving acid diffusion, increasing acid filling speed, decreasing the time it takes to fill a battery with acid, improving acid transport (e.g., making the acid transport more uniform over the entire electrode surface) to avoid hydration shorts, lowering battery manufacturing cost (because of increased acid filling speed), protecting electrodes, and/or improving overall battery life of a lead acid battery, especially a VRLA lead acid battery (including AGM, gel, and those batteries that combine aspects of AGM and gel).

Various embodiments of the invention described herein include the improved battery separators as shown or described herein, as well as batteries comprising the improved battery separators as shown or described herein. In addition, the present disclosure includes an improved method of acid-filling a valve-regulated lead acid battery using an improved battery separator as shown or described herein. Furthermore, the present disclosure includes an improved battery system including a VRLA battery, such as a VRLA AGM battery, and an improved separator wherein said improved separator significantly decreases the amount of time needed to fill said VRLA battery, such as a VRLA AGM battery, with acid.

And the present disclosure includes novel or improved battery separators, batteries, systems, and/or methods of manufacture and/or use, improved separators for VRLA batteries (including AGM, gel, and those batteries that combine aspects of AGM and gel) and/or improved methods of filling a VRLA battery with acid using a particular improved battery separator, methods, systems and battery separators for enhancing or facilitating acid filling, improving acid diffusion, increasing acid filling speed, decreasing the time it takes to fill a battery with acid, improving acid transport (e.g., making the acid transport more uniform over the entire electrode surface) to avoid hydration shorts, lowering battery manufacturing cost (because of increased acid filling speed), protecting electrodes, and/or improving overall battery life of a lead acid battery, especially a VRLA AGM lead acid battery (including AGM, gel, and those batteries that combine aspects of AGM and gel), and/or the like as shown or described herein.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A composite battery separator comprises at least one AGM layer and at least one microporous polyolefin separator layer, said microporous polyolefin separator layer having a first surface and a second surface, at least said first surface comprising ribs, embossments, acid filling channels, or a combination thereof, and said microporous polyolefin separator layer comprises first areas comprising smaller pores and a compressed pore structure and second areas comprising larger pores and a pore structure less compressed than the pore structure of the first areas.

2. The separator of claim 1, wherein said microporous polyolefin separator layer comprises polyethylene and silica.

3. The separator of claim 1, wherein said ribs are are 0.008 to 1 mm tall.

4. The separator of claim 1, wherein said ribs are spaced 0.001 to 10 mm apart.

5. The separator of claim 1, wherein said second surface of said microporous polyolefin separator layer also comprises ribs, embossments, acid filling channels, or a combination thereof.

6. The separator of claim 1, wherein said second surface of said microporous polyolefin separator layer comprises negative cross ribs.

7. The separator of claim 1, wherein the embossments are textured embossments, straight pattern embossments, wavy pattern embossments, embossments in a picture pattern, zigzag pattern embossments, or a combination thereof.

8. The separator of claim 1 comprising an AGM layer on each side of said microporous polyolefin separator layer.

9. The separator of claim 1, wherein said AGM layer comprises glass fibers, polymeric fibers, or a combination thereof.

10. The separator of claim 1, wherein said separator is about 10% to 40% compressible at a pressure greater than 10 kpa.

11. The separator of claim 1 further comprising a coating of a surfactant on at least one surface of said microporous polyolefin separator layer.

12. A VRLA battery comprising a positive electrode, a negative electrode, liquid acid electrolyte, and the composite battery separator of including at least one AGM layer and at least one microporous polyolefin separator layer, said microporous polyolefin separator layer having a first surface and a second surface, at least said first surface comprising ribs, embossments, acid filling channels, or a combination thereof, and said microporous polyolefin separator layer comprises first areas comprising smaller pores and a compressed pore structure and second areas comprising larger pores and a pore structure less compressed than the pore structure of the first areas.

13. The VRLA battery of claim 12, wherein an AGM layer of the composite separator is placed against the positive electrode.

14. The VRLA battery of claim 12, wherein ribs, embossments, or acid filling channels on the microporous polyolefin separator layer are placed against the negative electrode.

15. The separator of claim 1, wherein at least one of said first and second surfaces of said microporous polyolefin separator layer has ribs, embossments, and acid filling channels.

16. The separator of claim 15, wherein the other of said at least one of said first and second surfaces of said microporous polyolefin separator layer has embossments and acid filling channels.

17. A composite battery separator comprises at least one nonwoven layer and at least one microporous polymer separator layer, said microporous polymer separator layer having a first surface and a second surface, at least one of said first and second surface comprising ribs, embossments, and acid filling channels, and said microporous polymer separator layer comprises first areas comprising smaller pores and a compressed pore structure and second areas comprising larger pores and a pore structure less compressed than the pore structure of the first areas.

18. The separator of claim 17, wherein said nonwoven layer includes glass fibers, polymeric fibers, or a combination thereof.

19. The separator of claim 17, wherein said polymer separator layer is a polyolefin separator layer.

20. The separator of claim 19, wherein said polyolefin separator layer comprises polyethylene and silica.

* * * * *